United States Patent
Baker et al.

(10) Patent No.: US 9,618,680 B2
(45) Date of Patent: Apr. 11, 2017

(54) METHODS AND APPARATUS FOR PROVIDING DISPLAY COMPONENTS

(71) Applicant: CORNING INCORPORATED, Corning, NY (US)

(72) Inventors: David Eugene Baker, Bath, NY (US); Michael Etienne, Corning, NY (US); Stephan Lvovich Logunov, Corning, NY (US); Daniel Aloysius Nolan, Corning, NY (US); Wageesha Senaratne, Horseheads, NY (US); Luis Alberto Zenteno, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 297 days.

(21) Appl. No.: 14/389,931

(22) PCT Filed: Apr. 5, 2013

(86) PCT No.: PCT/US2013/035371
§ 371 (c)(1),
(2) Date: Oct. 1, 2014

(87) PCT Pub. No.: WO2013/152256
PCT Pub. Date: Oct. 10, 2013

(65) Prior Publication Data
US 2015/0124480 A1    May 7, 2015

Related U.S. Application Data

(60) Provisional application No. 61/620,677, filed on Apr. 5, 2012.

(51) Int. Cl.
*F21V 8/00* (2006.01)
*G02B 5/02* (2006.01)

(52) U.S. Cl.
CPC ......... *G02B 6/0043* (2013.01); *G02B 5/0226* (2013.01); *G02B 5/0242* (2013.01);
(Continued)

(58) Field of Classification Search
CPC .. G02B 5/0242; G02B 5/0226; G02B 5/0278; G02B 6/0043; G02B 6/0028; G02B 6/0065; G02B 6/0031
(Continued)

(56) References Cited

U.S. PATENT DOCUMENTS 6,200,680 B1  3/2001  Takeda et al.
6,626,611 B2  9/2003  Winters et al.
(Continued)

FOREIGN PATENT DOCUMENTS

CN  101339260  1/2009
CN  102265193  11/2011
(Continued)

OTHER PUBLICATIONS

Arend et al; "Color breakup in sequentially scanned LCDs," in SID Symp. Tech. Dig., Jun. 1994, pp. 201-204.
(Continued)

*Primary Examiner* — Laura Tso
(74) *Attorney, Agent, or Firm* — Thomas R. Beall; Ryan T. Hardee

(57) ABSTRACT

Methods and apparatus for providing one or more components for a display system, particularly for producing diffused light.

23 Claims, 12 Drawing Sheets

(52) U.S. Cl.
CPC ......... *G02B 5/0278* (2013.01); *G02B 6/0028* (2013.01); *G02B 6/0031* (2013.01); *G02B 6/0065* (2013.01)

(58) Field of Classification Search
USPC ........................................................ 362/609
See application file for complete search history.

(56) References Cited

U.S. PATENT DOCUMENTS

| | | | |
|---|---|---|---|
| 7,911,699 B2 | 3/2011 | Wang et al. | |
| 8,283,845 B2 | 10/2012 | Itou et al. | |
| 8,672,492 B2 * | 3/2014 | Nagahama | G02B 5/0226 359/601 |
| 8,786,951 B2 * | 7/2014 | Wang | G02B 5/0242 359/599 |
| 8,787,717 B2 | 7/2014 | Logunov | |
| 8,929,703 B2 | 1/2015 | Logunov et al. | |
| 9,025,923 B2 | 5/2015 | Logunov et al. | |
| 9,093,003 B2 | 7/2015 | Logunov et al. | |
| 9,217,826 B2 | 12/2015 | Logunov et al. | |
| 2004/0253427 A1 | 12/2004 | Yokogawa et al. | |
| 2006/0001036 A1 | 1/2006 | Jacob et al. | |
| 2006/0098288 A1 | 5/2006 | Pan et al. | |
| 2009/0244413 A1 | 10/2009 | Ishikawa et al. | |
| 2013/0272014 A1 | 10/2013 | Logunov et al. | |

FOREIGN PATENT DOCUMENTS

| | | |
|---|---|---|
| JP | 2000247685 | 9/2000 |
| WO | 2012058084 | 5/2012 |
| WO | 2013055841 | 4/2013 |

OTHER PUBLICATIONS

Beckmann et al; "The scattering of electromagnetic waves from rough surfaces", Artech House, 1987.
Clark et al; "A field-sequential color CRT using a liquid crystal color switch," in SID Symp. Tech. Dig., May 1982, pp. 172-173.
Florence et al; "Display system architectures for DigitalMicromirror Device (DMD) based projectors," in Proc. SPIE, Mar. 1996, vol. 2650, pp. 193-208.
Fujimori et al; "High-transmissive advanced TFT LCD technology," Sharp Tech. J., No. 4, Apr. 2003, Special Papers 1.
Hasebe et al; "A full-color field-sequential LCD using modulated backlight," in SID Symp. Tech. Dig., May 1985, pp. 81-83.
Hirakata et al; "Super-TFT-LCD formoving picture images with the blink backlight system," in SID Symp.Tech. Dig., Jun. 2001, pp. 990-993.
Johnson, et al., LC/CRT Field-Sequential Color Display, in SID Symp. Tech 82 Dig., May 1983, pp. 28-29.
Kim et al; "A new transflective TFT-LCD with dual color filter," in Proc. Int'l Display Workshops, Dec. 2002, pp. 433-436.
Lee et al; "A multimode-type transflective liquid crystal display using the hybridaligned nematic and parallel-rubbed vertically aligned modes," Jpn. J. Appl. Phys. Part 1, vol. 42, pp. 5127-5132, Aug. 2003.
Lee et al; "Novel frame buffer pixel circuits for liquid-crystal-on-silicon microdisplays," IEEE J. Solid-StateCircuit, vol. 39, pp. 132-139, Jan. 2004.
Liu et al; "A novel double gamma driving transflective TFT LCD," in Proc. Int. Display Manuf. Conf., Feb. 2003, pp. 215-218.
Mori et al; "Mechanism of color breakup on field-sequential color projectors," in SID Symp. Tech. Dig., May 1999, pp. 350-353.
Purcell et al; The Astrophysical Journal, 186, 705-714, Dec. 1, 1973, "Scattering and absorption of light by nonspherical dielectrical grains".
Van de Hulst, "Light Scattering by small particles", Dover publications, 1957.
Vatne et al; "A LC/CRT field-sequential color display," in SID Symp. Tech. Dig., May 1983; pp. 28-29.
Woo et al; "Optimization of LED backlight flashing time for field sequential color LCDs," in Proc IDW, Dec. 2003, pp. 1681-1682.
Yu et al; "Multimode transtlective liquid crystal display with a single cell gap using a self-masking process ofphotoalignment," Appl. Phys. Lett., vol. 85, pp. 5146-5148, Nov. 2004.
Zhu et al; "Transflective liquid crystaldisplays," J. Display Technol., vol. 1, pp. 15-29, Sep. 2005.

* cited by examiner

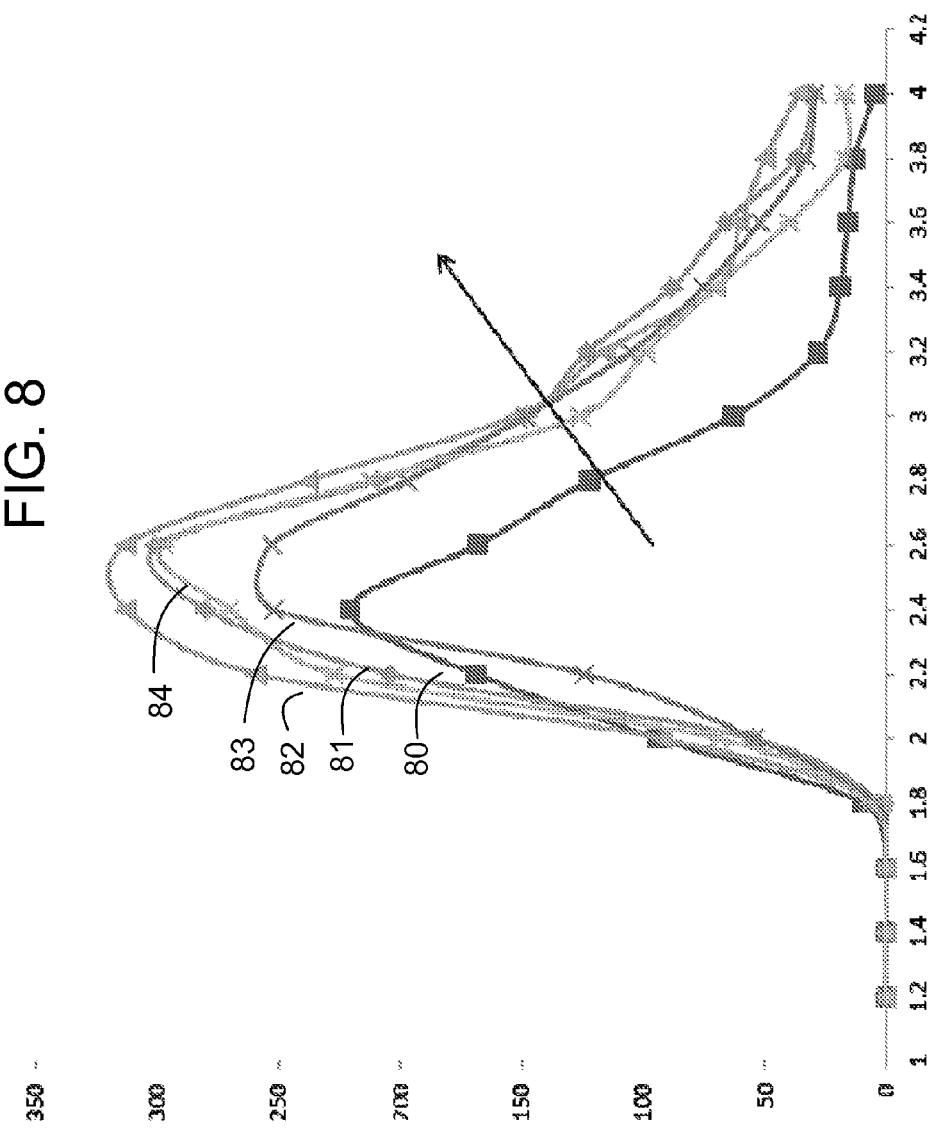

200

METHODS AND APPARATUS FOR PROVIDING DISPLAY COMPONENTS

CROSS-REFERENCE TO RELATED APPLICATIONS

This application claims the benefit of priority under 35 U.S.C. §119 of U.S. Provisional Application Ser. No. 61/620,677 filed on Apr. 5, 2012, the content of which is relied upon and incorporated herein by reference in its entirety.

FIELD OF THE DISCLOSURE

The present disclosure relates to methods and apparatus for providing one or more components for a display system, particularly for producing diffused light.

BACKGROUND

Conventional components used to produce diffused light have included diffusive glass, which has been employed in a number of applications in the display industry. These applications include bezel-free television systems, liquid crystal displays (LCDs), electrophoretic displays (EPD), organic light emitting diode displays (OLEDs), plasma display panels (PDPs), micro-electromechanical structures (MEMS) displays, electronic reader (e-reader) devices, and others.

It has been discovered, however, that commercially available diffusive glasses do not meet certain new and important requirements for the emerging display industry.

It has also been discovered that certain types of displays within the display industry, such as translucent (semi-transparent) displays, suffer from some poor performance characteristics because conventional display components, particularly as concerns providing a source of backplane illumination, will not meet the performance requirements of the marketplace.

SUMMARY

It has been discovered that a commercially attractive display system includes a glass component as a foundation on which a plurality of electronically controllable display components are disposed. The glass component includes a generally planar sheet construction having a surface directed towards a viewer, and an opposing surface on which the plurality of display components (such as MEMS components, OLED components, or the like) are disposed. The collection of individual display components define a large number of pixel sites for manipulating light in accordance with electronic control signaling in order to provide desirable display resolution to the viewer.

The glass component provides a light diffusing characteristic, such that any light entering the glass sheet from one or more edges, from one or more borders, and/or from the viewing surface is diffused as it propagates toward the display elements. In this regard, the glass component includes one or more light diffusing features, such that the glass component operates as a diffusive glass component. The light diffusing features may include the provision of a plurality of light scattering sites in proximity to the surface of the glass sheet opposite to the viewing surface, i.e., proximate to the surface on which the display elements are disposed.

Important attributes of the diffusive glass include a large forward-to-backward scattering ratio, high haze ratio, high light transmission ratio, and wide angular light scattering characteristics. In certain of the display system applications, the light scattering sites need to be near, but buried below, the surface on which the display elements are disposed. Indeed, they must enable light scattering within a few microns of the surface. This is especially the case when a transparent conductive oxide (TCO) layer is deposited above such surface, between the surface of the glass sheet and the display elements. In addition, there may be a significant flatness requirement for the surface on which the display elements are disposed, which is specified as a function of the pixel length (a measurement associated with the rather small dimensions of the individual display elements). Another important requirement is that the glass sheet with the light diffusing features (such as the light scattering elements and associated structures) must maintain their performance properties when subject to downstream processes, such as the deposition of the display elements thereon, which may subject the glass component to processing temperatures of about 400 degrees C. or even higher.

Although it is possible to find commercially available diffusive glass, none of the available glass meets the above mentioned new and important requirements for the emerging display industry. For example, one can purchase from Edmund Optics a diffusive glass having a roughened surface designed to scatter light at wide angles. This glass, however, cannot be used for the aforementioned new display application(s) because the scattering functionality relies on a roughened surface, where the scattering feature dimensions are significantly larger than is acceptable for the deposition of the display elements, such as the deposition of a TCO layer. Further, these large dimension features would cause undesirable high resistance or shunting of the electrical properties in a display system. Scattering in glass can also be achieved using phase separated glasses, glass ceramics or frits doped with crystals. None of these glasses, however, will enable scattering within a few microns of the glass surface.

In accordance with one or more embodiments herein, methods and apparatus have been developed to provide a diffusive glass structure, in which scattering elements (i.e., particles, agglomerates, or aggregates) are adsorbed onto a glass substrate and fixed there using a binder material. The elements may be on the order of hundreds of nanometers in size, such as about 250 nm. In some applications, the elements are characterized by a relatively high refractive index (such as about 2.0) as compared with the refractive index of the glass sheet and the binder, which may be on the order of about 1.4-1.6, or about 1.43 to about 1.56. In other applications, the elements need not be of high refractive index, but rather may be on the order of the same refractive index as the glass sheet and the binder material. The light scattering feature achieved by the elements may be formed via a single layer of particles, agglomerates, or aggregates, or it may be formed via multiple layers. Either implementation may result in a height dimension of the elements of between the sub-micron level to a micron or more. The binder may be employed to partially or fully fill the voids between the elements to control the surface characteristics (such as the flatness) of the surface of the glass component. When sufficient binder is employed (which may include multiple layers), the binder may form a planarizing layer, extending from sub-microns to microns above the elements.

The above-described glass components provide high haze ratios, high transmission ratios, suitably flattened surfaces for downstream thin film deposition processes, desirable light scattering features (e.g., wide angular scattering) within microns of the surface of the glass component, and survival of downstream processing temperatures of about 400 degrees C. and higher. Furthermore, the contemplated glass components may be produced using a wide variety of glass substrate types.

In accordance with one or more further embodiments herein, methods and apparatus have been developed to provide a backplane for a display system.

Commercial translucent display systems, such as translucent (semi-transparent) LCD televisions are commercially available for digital signage and advertising applications. These display systems are semi-transparent in the "off state" (i.e., when no image is being commanded by the associated electronics driving the LCD elements). In order to maintain the semi-transparent characteristics, these display systems do not employ an opaque optical backplane in order to produce light to excite the LCDs. Instead, the display systems use background, ambient light to excite the LCDs in the "on state" (i.e., when the associated electronics is commanding an image). Thus, one can see through the display system and view objects (such as merchandise, etc.) behind the display screen. Concurrently, the viewer can also receive visual information on certain portions of the screen (or the entire screen), which in a commercial application would likely be related to the merchandise behind the screen.

A significant issue with the semi-transparent display systems, however, is that they are not particularly transparent. In fact, measurements have shown that they exhibit only about a 15% transmission ratio. Thus, one must often provide a relatively high level of ambient light in proximity to the screen, which might not always be feasible or even desirable for any number of reasons. The result is an array of problems in terms of uniformity of image quality across the display, such as non-uniformity in color, contrast ratio, etc.

Thus, in accordance with one or more further embodiments herein, a transparent backplane is provided for a transparent display system. The transparent backplane is formed using some or all of the components discussed above in connection with the diffusive glass structure. The diffusive glass structure is placed behind the translucent display system, and light is introduced into the glass sheet along one or more edges thereof, and/or along one or more borders thereof. The light propagates in a waveguide fashion within the glass sheet and is incident on the light scattering portion. Thus, the light scatters out of the transparent backplane and illuminates the LCDs of the translucent display system. The transparent backplane therefore improves the light source for the LCD elements of the translucent display system. The scattering elements are chosen and deployed in order to provide suitable refractive index characteristics and dimensions to achieve the proper light wavelength(s) and angle independent excitation of the LCDs. In addition, the scattering elements produce a suitable haze ratio, which is low enough so as to achieve a high level of transparency of the backplane (one can visually see through it) when portions of the display system are in the off state.

Advantages of the transparent backplane include increased brightness, maintaining transparency (in the off state), improved light uniformity, improved light wavelength and incidence angle, improved color coordinates, and relatively simple and cost-effective input optics.

Other aspects, features, and advantages of the embodiments of the present disclosure will be apparent to one skilled in the art from the description herein taken in conjunction with the accompanying drawings.

DESCRIPTION OF THE DRAWINGS

For the purposes of illustration, there are forms shown in the drawings that are presently preferred, it being understood, however, that the embodiments are not limited to the precise arrangements and instrumentalities shown.

FIG. 8 is a histogram of plots for frequency versus perimeter-Feret (max) Ratio for a number of samples that were prepared using a surfactant added to the solution used for the deposition of scattering particles on the light diffusing apparatus of FIG. 1;

DETAILED DESCRIPTION OF THE EMBODIMENTS

With reference to the drawings wherein like numerals indicate like elements there are shown in the figures a number of features and methodologies suitable to use in connection providing various optical components for one or more display systems.

Light Diffusing Structure/Methodology

Figure 1:
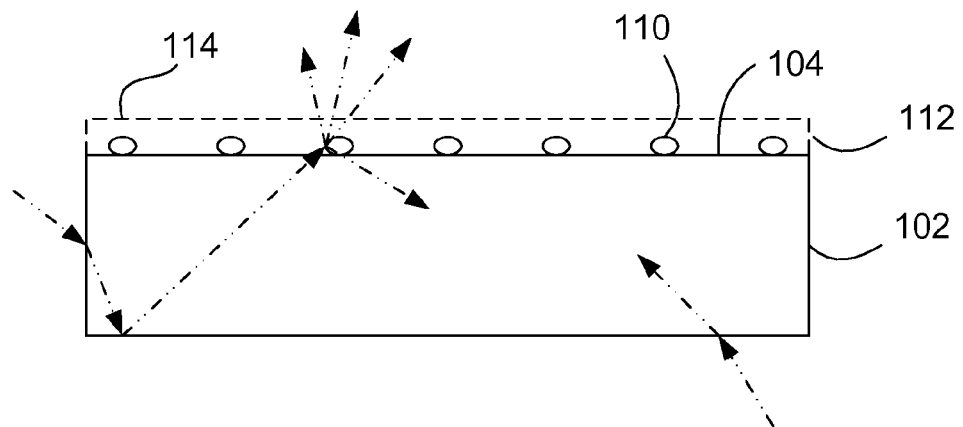
FIG. 1 is a side-sectional view of a light diffusing apparatus in accordance with one or more embodiments herein.
Figure 2:
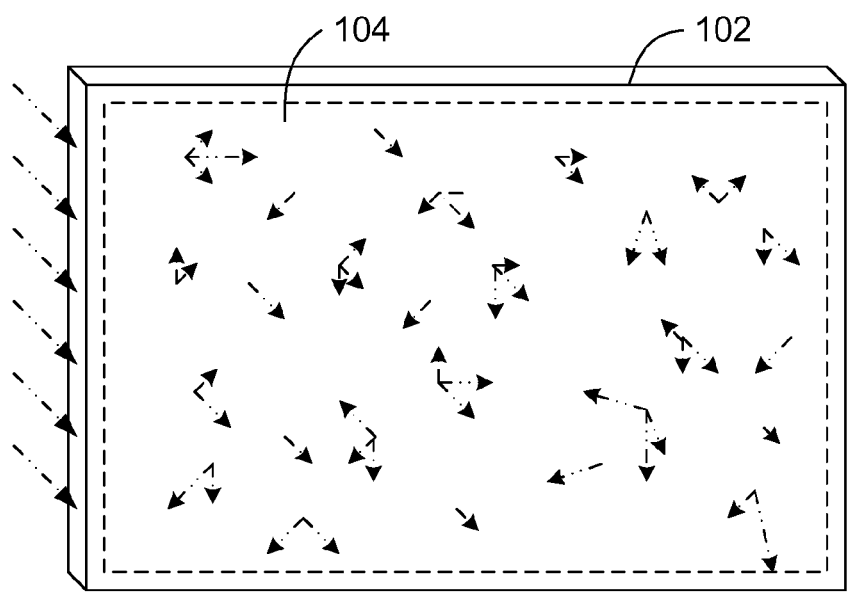
FIG. 2 is a front elevational view of the light diffusing apparatus of FIG. 1.

With reference to FIGS. 1-2, a diffusing apparatus 100 in accordance with one or more embodiments herein may be employed to process light for a display system. In general, the diffusing apparatus 100 operates to receive light from one or more edges or borders of the structure, propagate the light within a glass structure and diffuse and scatter the light out a front of the structure (as illustrated by the arrows in FIG. 2) for useful purposes.

The diffusing apparatus 100 includes a glass sheet 102 having first and second spaced apart, planar surfaces 104, 106. Any suitable commercially available glass sheet may be employed, which can withstand the processing parameters expressly or inherently disclosed herein. The diffusing apparatus 100 also includes at least one scattering layer having a plurality of sub-micron sized light scattering elements 110 disposed on the first surface 104 of the glass sheet 102. A binder material 112 is disposed on the first surface 104 of the glass sheet 102 and at least partially fills voids between adjacent scattering elements 110.

As illustrated by the dashed arrows, light may enter the glass sheet 102 and begin propagating therethrough until the rays of light impinge upon the scattering elements 110. Given the optical properties of the glass sheet 102, the scattering elements 110, and the binder material 112 (which will be discussed in greater detail below) the light scatters out of the diffusing apparatus 100. When a single layer of scattering elements 110 are employed, then the optical characteristics are generally of the surface scattering variety. On the other hand, when the scattering elements 110 are built up by a number of layers, then the optical characteristics are generally of the volumetric scattering variety.

Figure 3:
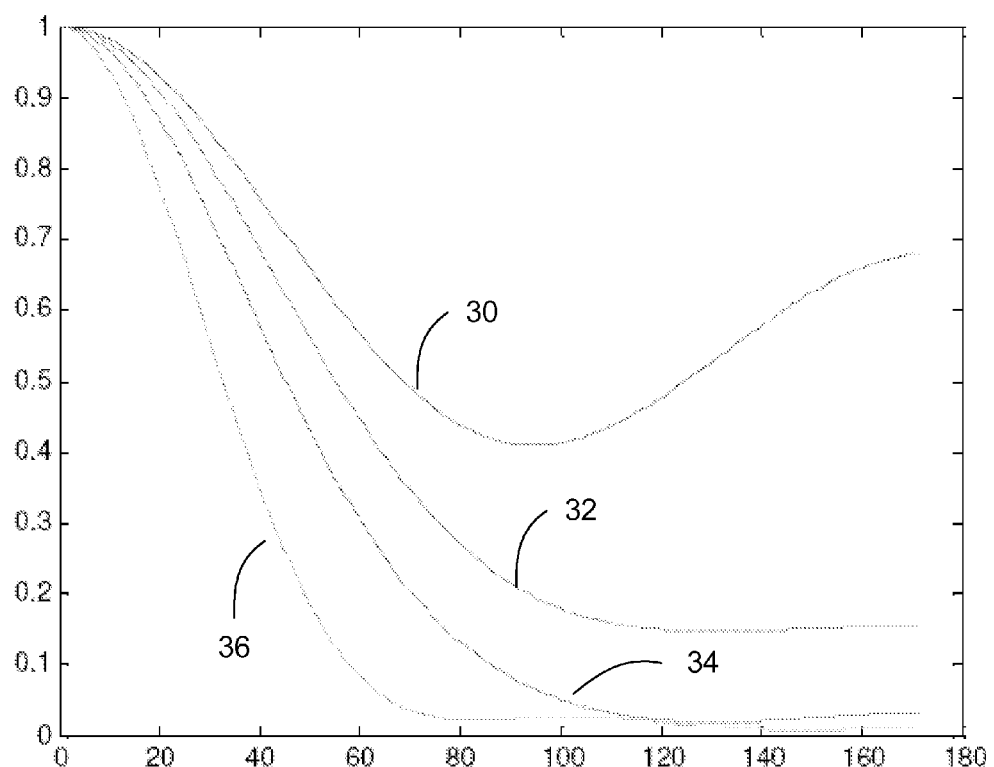
FIG. 3 is a graph of scattering cross-section and scattering angle for scattering particles of varying size.

Reference is now made to FIG. 3, which is a graph of scattering cross-section (on the Y-axis) and scattering angle (on the X-axis) for varying sized particles. The light scattering elements 110 are formed from one or more of individual particles, agglomerates, and/or aggregates of particles. When the individual particles are of a suitable size then agglomerating and/or aggregating such particles may not be necessary. On the other hand, when the individual particle sizes are too small, then it is desirable to agglomerate or aggregate the particles to form respective scattering elements 110 of suitable size. The graph of FIG. 3 shows four plots 30, 32, 34, 36, each representing the characteristics of four different particle sizes, specifically 50 nm, 100 nm, 150 nm, and 200 nm. The plots were generated using Mie scattering calculations derived for spherical scattering sites. Thus, the plots illustrate approximations of the optical characteristics of the individual particles or agglomerates of approximately spherical shapes forming the scattering elements 110.

The plots of FIG. 3 indicate that small particles scatter backwards as well as forwards, and particles of about 150 nm and larger scatter predominately forward, which is generally desirable in the diffusing apparatus 100. Indeed, as will be discussed in more detail below, scattering in predominantly the forward direction facilitates high transmission ratios and high haze ratios in the apparatus 100. More particularly, the plots show the calculated angular dependence of the normalized scattering cross section as a function of particle size. The results indicate that the general dimensions of the particles or agglomerates should be on the order of about 200 nm (assuming a generally spherical shape or approximated shape) in order to achieve a high transmission ratio. Indeed, as smaller particles tend to backscatter the light, the resultant transmission ratio would be adversely affected. Particles greater than about 500 nm scatter light forward, but the angular spread is small, which is less desirable.

Given the above optical scattering characteristics as a function of scattering element size, the approximate diameter of each scattering element 110 may be one of: (i) between about 100 nm to about 500 nm, (ii) between about 200 nm to about 300 nm, and (iii) about 250 nm.

The optical light scattering characteristics of the diffusing apparatus 100 are also affected by the refractive indices of the glass sheet 102, the scattering elements 110, and the binder material 112. In some applications, the scattering elements 110 are characterized by a relatively high refractive index as compared with the refractive index of the glass sheet 102 and the binder material 112. The glass sheet 102 and the binder material 112 will likely have refractive indices on the order of about 1.4-1.6, or about 1.43 to about 1.56. Thus, when the scattering elements 110 are characterized by a relatively high refractive index, then such refractive index may be one of: (i) between about 1.5 and about 4.0, (ii) between about 1.7 and about 2.5, and (iii) at least 2.0.

By way of example, the scattering elements may be formed from agglomerates of Titania ($TiO_2$), Cerium oxide ($Ce_2O_3$), Zinc Oxide (ZnO), and/or Zirconium Dioxide ($ZrO_2$). Skilled artisans will appreciate that other materials may also be found suitable for use in the apparatus 100 if a reasonable amount of investigation is performed. As mentioned above, the elements 110 may be on the order of about 250 nm in size, and therefore employing the listed oxides may require agglomeration and/or aggregation to achieve the desired size.

As mentioned above, the binder material 112 may have a refractive index substantially similar to the refractive index of the glass sheet, such as: (i) between about 1.2 and about 1.7, (ii) between about 1.3 and about 1.6, and (iii) about 1.5. By way of example, the binder material layer 112 may be formed from one or more of: polymerized or partially cured poly alkyl siloxane, poly-dimethyl-siloxane, poly-diphenyl-siloxane, polymerized alkyl or aryl silsesquioxane T-resins, poly-methyl-silsesquioxane, poly-methyl-phenyl-silsesquioxane, poly-phenyl-silsequioxane, and uv curable poly siloxanes or silsesquioxanes. Then the binder material 112 is cured to completion using a thermal or uv curable curing step In addition to the refractive index, the binder material 112 may be chosen based on one or more of: solubility (organic solvent versus aqueous solvent), viscosity (ability to flow), ability to react with both the glass sheet 102 and itself so that the binder material 112 can be cured to completion, and ability to be stable up to process temperatures of about 400 C to 600 C.

Figure 4A:
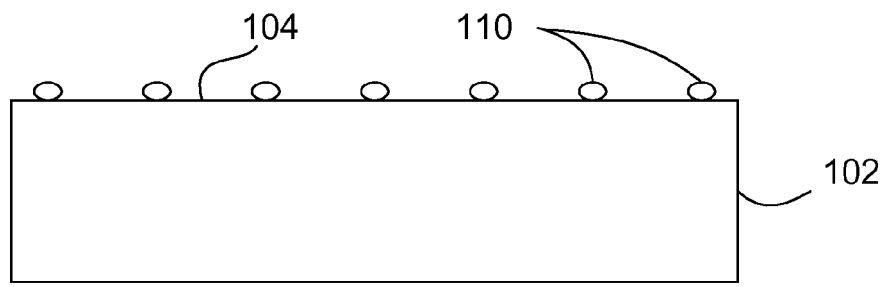
FIGS. 4A, 4B, and 4C are side sectional views of intermediate structures for illustrating a method of producing the light diffusing apparatus of FIG. 1.
Figure 4B:
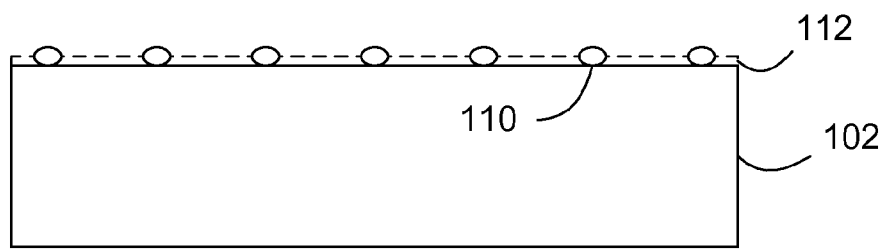
Figure 4C:
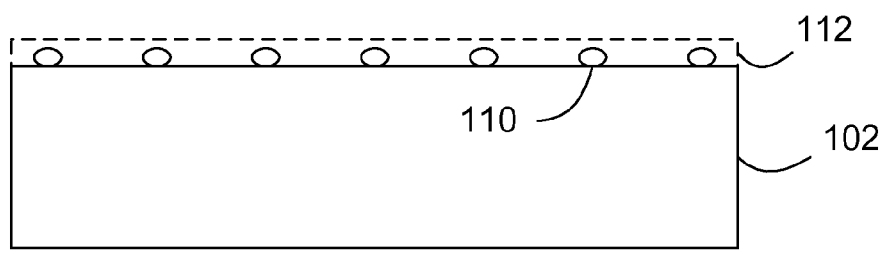

Reference is now made to FIGS. 4A, 4B, and 4C, which are side sectional views of intermediate structures for illustrating a method of producing the diffusing apparatus 100 of FIG. 1. As illustrated in FIG. 4A, the first surface 104 of the glass sheet 102 is prepared in a way to promote its adsorption characteristics, which may involve surface cleaning and preparation.

Next, a plurality of sub-micron sized light scattering elements 110 is disposed onto the first surface 104 of the glass sheet 102 such that they adsorb thereto. The step of disposing the light scattering elements 110 may include employing a dip coating or spin coating process to apply a flowable phase (e.g., a slurry or solution) of the elements 110 onto the first surface 104. As there is a relationship between the quantity and spacing of the scatting elements 110 on the first surface 104 and the resultant transmission and haze ratios, care should be taken during the deposition step. Indeed, when the scattering elements 110 have a relatively high refractive index and the glass sheet 102 and binder material 112 have a lower refractive index, as the spacing between elements 110 increases, the haze ratio also increases (at least within a particular range).

The spacing of the scattering elements 110 may be controlled by varying a concentration (e.g., characterized by a weight percentage) of the scattering elements 110 in the slurry applied to the surface 104 using the dip coating or spin coating process. It has been found that a concentration of about 10% by weight of the scattering elements 110 (formed from Titania) in the slurry will yield on the order of about a 40% haze ratio in the finished diffusing apparatus 100. Contrast that with a concentration of about 40% by weight of the scattering elements 110 (formed from Titania) in the slurry yielding on the order of about a 100% haze ratio.

Further, the characteristics of the quantity and spacing of the scatting elements 110 on the first surface 104 may also be controlled by varying the parameters of the spin coating process (such as the spin speed, ramp rate, duration, temperature, etc.), and/or the dip coating process (such as the withdrawal speed, concentration, temperature of the enclosure and dipping solution, etc.).

Once the scatting elements 110 have been disposed on the first surface 104 of the glass sheet 102, a heat treating process is carried out to drive off excess liquids. The heat treating process may include elevating the temperature of the intermediate structure (FIG. 4A) to about 120 degrees C. for about 1-2 hours.

Next, as illustrated in FIG. 4B, a flowable binder material 112 is disposed onto the first surface 104 of the glass sheet 102 such that the binder material 112 at least partially fills voids between adjacent scattering elements 110. Thereafter, the binder material 112 is cured in accordance with the manufacturer's specifications. It is noted that varying the thicknesses of binder material 112 may be achieved by controlling the processing parameters of the deposition. By way of example, the flowable binder material 112 may be applied using a dip coating or spin coating process. Thus, the parameters of such processes (speed, duration, temperature, etc.) may be adjusted to achieve a desired thickness of binder material 112. Alternatively, a plurality of coats of binder material 112 may be applied in order to build up the thickness of the binder layer 112. As illustrated in FIG. 4B, the binder material layer 112 need not entirely cover the scattering elements 110. However, in the embodiment illustrated in FIG. 4C, the binder material layer 112 completely fills the voids and covers the scattering elements 110 to produce a planarization layer 114. In connection with the embodiment of FIG. 4C, the extent to which the binder material layer 112 extends above the scattering elements 110 may vary depending on the application, from sub-microns to a micron or more.

In accordance with one or more further embodiments, the number of coats of the binder material 112 may be different on different areas of the glass sheet 102 to produce differing transmission ratios, haze ratios, and/or scattering at one or more of such areas. For example, the number of coats may be increased in one or more central areas of the glass sheet 102 to produce higher scattering at one or more of such central areas as compared to one or more peripheral areas (surrounding the central areas) of the glass sheet 102.

Figure 5A:
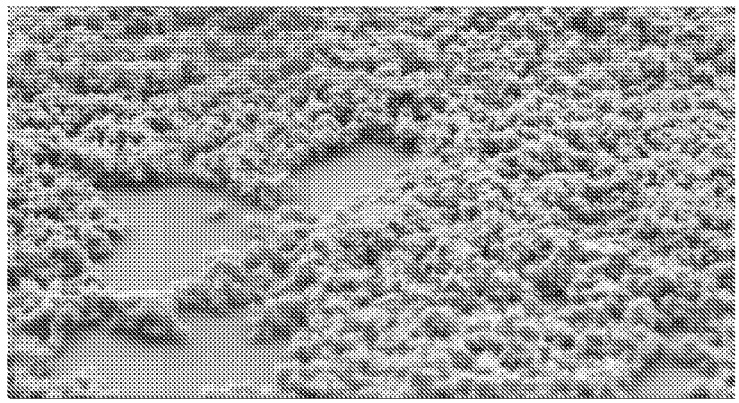
FIGS. 5A-5E are respective scanning electron microscope (SEM) images of light scattering elements disposed on a surface of the light diffusing apparatus, with each image showing differing binder characteristics.
Figure 5B:
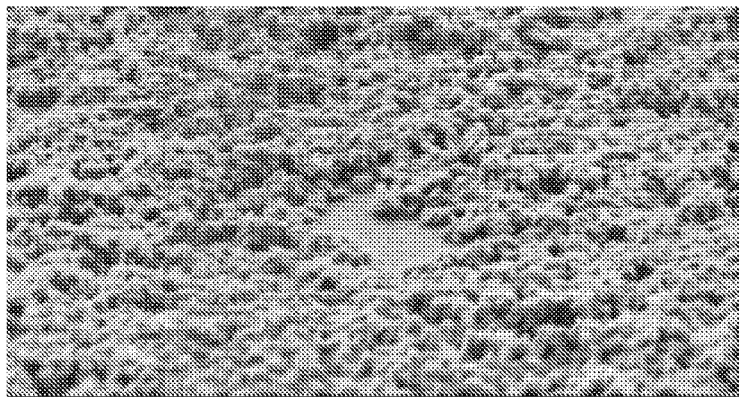
Figure 5C:
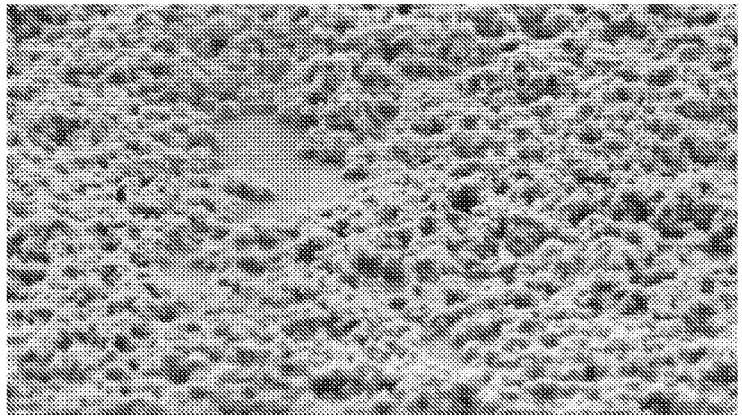
Figure 5D:
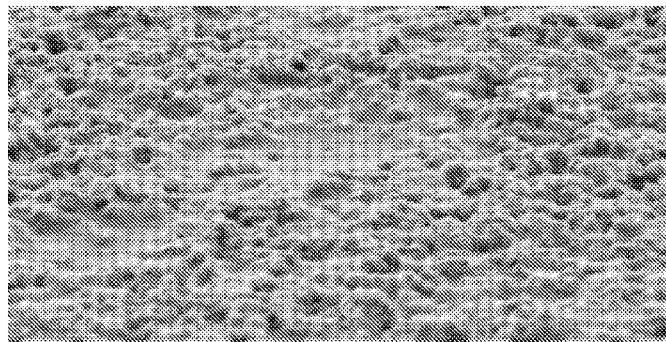
Figure 5E:
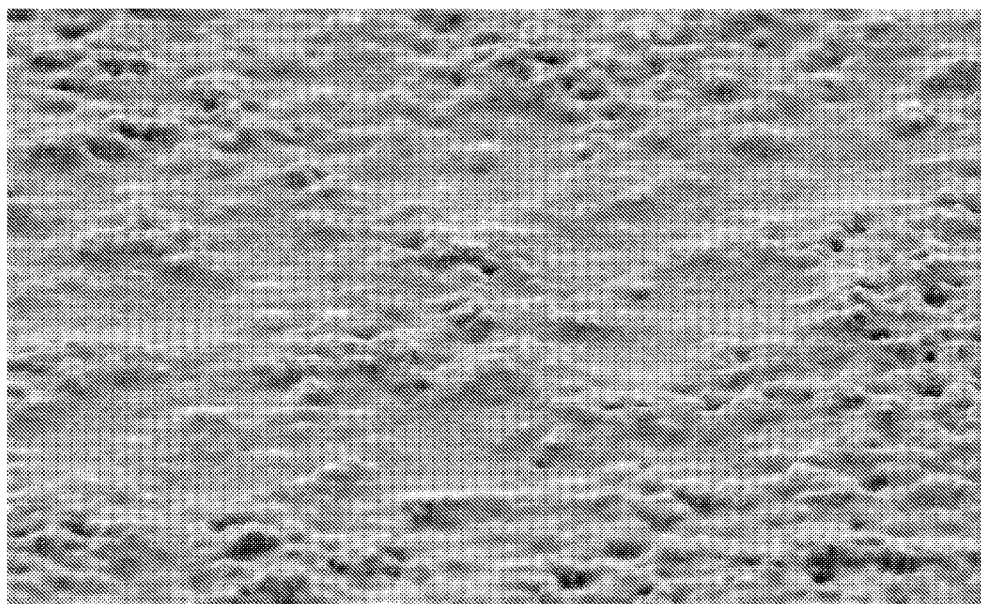

Reference is now made to FIGS. 5A-5E, which are SEM images of the intermediate structure of FIGS. 4A-C employing differing binder material 112 thicknesses. FIG. 5A is an image of the apparatus 100 employing 20% rutile Titania agglomerate elements 110, which have been adsorbed onto the first surface 104 of the glass sheet 102 using a dip coating process. In FIG. 5A, no binder material 112 has been applied. FIG. 5B shows an image of the diffusing apparatus 100 after a binder material layer 112 of 25% concentration HardSil™ in isopropanol AM (Gelest, PP1-HSAM 19-21 wt % of solids, 25% concentration has about 5% solids) has been applied using a dip coating process at a withdrawal speed of 50 mm/minute. FIG. 5C shows an image of the diffusing apparatus 100 after a binder material layer 112 of 25% concentration HardSil™ AM has been applied using a dip coating process at a withdrawal speed of 70 mm/minute. FIG. 5D shows an image of the diffusing apparatus 100 after a binder material layer 112 of 50% concentration HardSil™ AM (about 10 wt % solids) has been applied using a dip coating process at a withdrawal speed of mm/minute. FIG. 5E shows an image of the diffusing apparatus 110 after a binder material layer 112 has been almost completely covered the scattering elements 110.

It has been discovered that application of the binder material layer 112 will have an effect on the resultant transmission ratio and haze ratio. For example, seven (7) diffusing apparatus 100 were produced, each representing a respective sample A-G for evaluation. Each sample was prepared by applying 20% rutile Titania agglomerate to a glass sheet 102 using a dip coating process at 40 degrees C. and a withdrawal rate of 125 mm/minute. The samples were then subject to a heat treatment process at 120 degrees C. for sufficient time to drive off excess water and/or other liquids.

The first two samples (A, B) were not subject to application of a binder layer 112 but were subject to a sintering step at 600 degrees C. for about 1 hour to establish a basis for the transmission ratio of between 79%-82.6%, and a basis for the haze ratio of between 52.7% and 53.9%.

Sample C was subject to application of a binder layer 112 of 50% concentration HardSil™ AM at a dip coating withdrawal rate of 25 mm/minute and sintering at 600 degrees C. for about 1 hour—resulting in a transmission ratio of 73.3%, and a haze ratio of 65.4%.

Sample D was subject to application of a binder layer 112 of 50% concentration HardSil™ AM at a dip coating withdrawal rate of 50 mm/minute sintering at 600 degrees C. for about 1 hour—resulting in a transmission ratio of 86.2%, and a haze ratio of 46.8%.

Sample E was subject to application of a binder layer 112 of 25% concentration HardSil™ AM at a dip coating withdrawal rate of 50 mm/minute and sintering at 600 degrees C. for about 1 hour—resulting in a transmission ratio of 81.7%, and a haze ratio of 68.7%.

Sample F was subject to application of a binder layer 112 of 25% concentration HardSil™ AM at a dip coating withdrawal rate of 70 mm/minute and sintering at 600 degrees C. for about 1 hour—resulting in a transmission ratio of 81.0%, and a haze ratio of 69.1%.

Sample G was subject to application of a binder layer 112 of 100% concentration HardSil AM (about 20 wt % solids) at a dip coating withdrawal rate of 50 mm/minute and sintering at 600 degrees C. for about 1 hour—resulting in a transmission ratio of 76.7%, and a haze ratio of 59.9%.

The above experimentation revealed that the apparatus 100 exhibits at least one of the following optical characteristics: (i) a transmission ratio of between about 70% to about 90%; and (ii) a haze ratio of between about 50% to about 75%.

Process Employing a Surfactant

Reference is now made to FIGS. 6A-6B, 7A-7B, and 8, which relate to the use of a surfactant in the process of producing the light diffusing structure 100. In this regard, the details discussed in connection with the process of FIGS. 4A-4C are of consideration here. In particular, in accordance with one or more further embodiments, a surfactant is employed in the coating solution when the light scattering elements 110 are disposed onto the first surface 104 of the glass sheet 102. It has been discovered that the addition of the surfactant has an impact on at least one of (and often both) the haze ratio and transmission ratio of the resulting structure 100. In particular, higher transmission ratio and haze ratio (expressed as percentages) have been observed. For example, as discussed above with respect to FIGS. 5A-5E, values on the order of 80% transmission and 70% haze were achieved. However, with the use of a surfactant in the coating solution, even the initial values were found to be as high as 75-80% transmission and greater than about 90% haze. The increase in haze ratio may be due to the surfactant either dispersing the particles 110 better in solution and then acting as binding agent to the particles 110 (e.g., Titania nanoparticles) and agglomerating the particles more uniformly while being coated onto the substrate (via the dip or spin process) to produce the resultant light scattering elements 110.

Figure 6A:
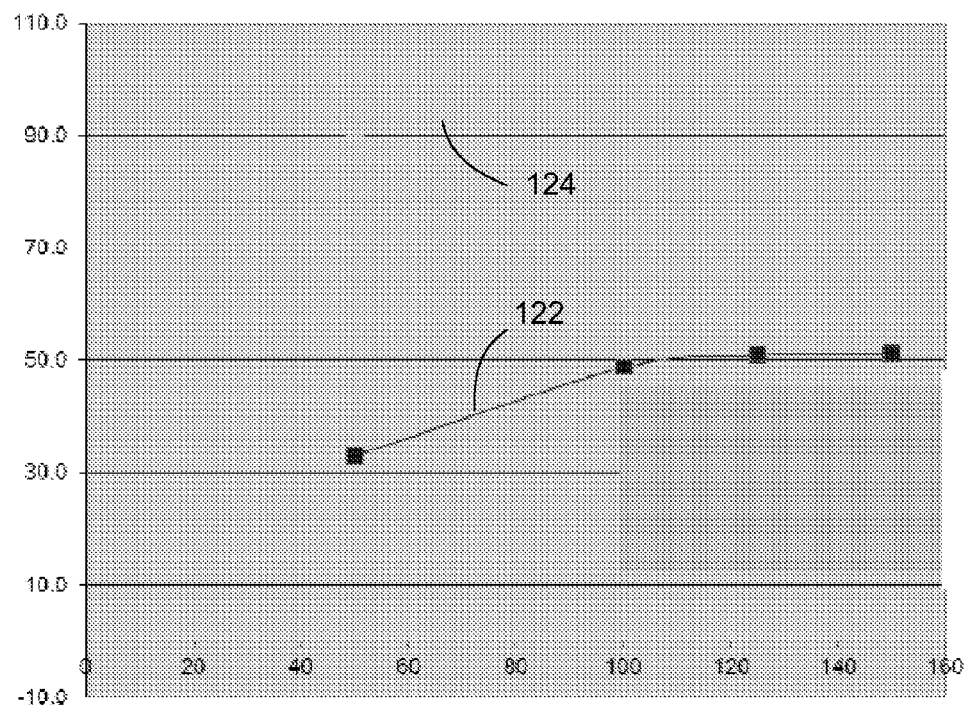
FIGS. 6A-6B are graphs of a haze ratio and a transmission ratio (expressed as percentages), respectively, when a surfactant is added to the solution used for the deposition of scattering particles on the light diffusing apparatus of FIG. 1.
Figure 6B:
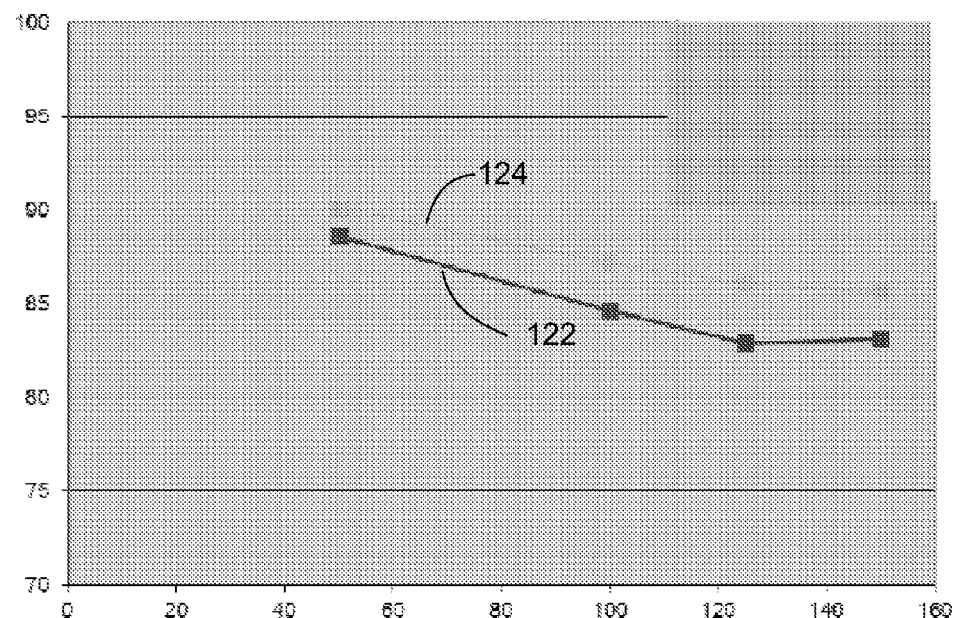

With specific reference to FIGS. 6A-6B, comparative samples were prepared in which disposing the light scattering elements 110 onto the top surface 104 of the glass sheet 102 was carried out using a dip coating process, which some samples including a surfactant in the coating solution and some not including a surfactant. The dip coating process was also conducted using differing withdrawal rates for different samples. In each case, 10% rutile Titania was employed to produce the light scattering elements 110. In the samples in which a surfactant was employed (the plots labeled 124), the surfactant was Pluronics™ P123 (specifically 5%), although other surfactants may be employed without departing from the contemplated embodiments. FIGS. 6A-6B are graphs of a haze ratio and a transmission ratio (on the Y-axis), expressed as percentages, versus a dip withdrawal speed (on the X-axis). FIGS. 6A-6B show that both the haze ratio and the transmission ratio were increased as a result of adding the surfactant, irrespective of dip withdrawal rate. It is believed that similar results would be obtained using a spin coating process, or other suitable process.

Figure 7A:
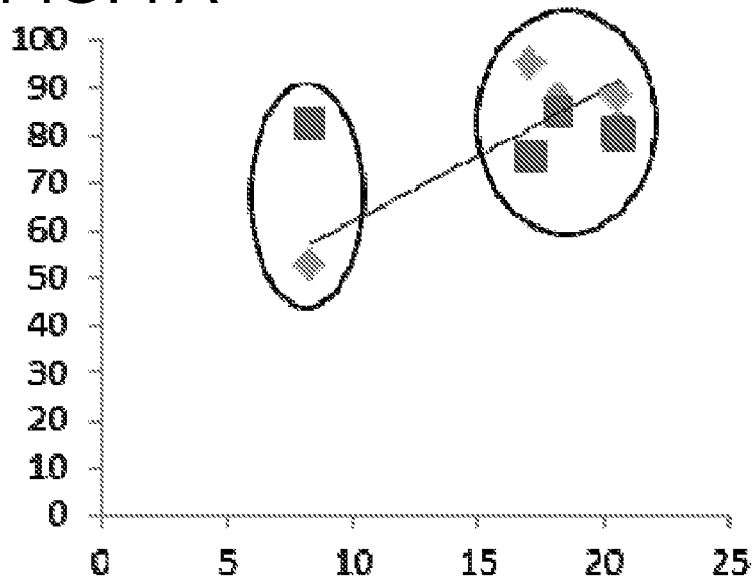
FIGS. 7A-7B are graphs of a haze ratio and a transmission ratio (expressed as percentages) as functions of open areas and roundness, respectively, when a surfactant is, and is not, added to the solution used for the deposition of scattering particles on the light diffusing apparatus of FIG. 1.
Figure 7B:
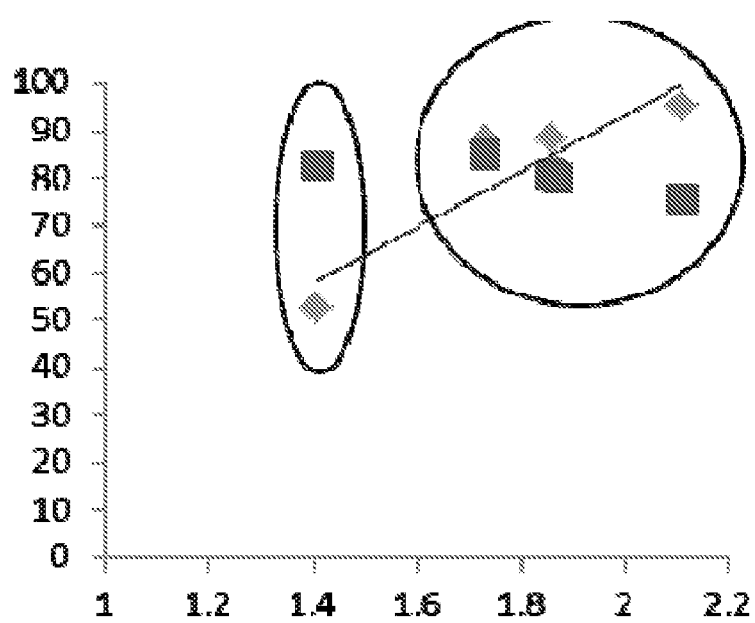

FIG. 7A is a graph of a haze ratio and a transmission ratio (on the Y-axis, expressed as a percentage) as functions of open areas (on the X-axis, expressed as a percentage) using the samples discussed above. FIG. 7B is a graph of a haze ratio and a transmission ratio (on the Y-axis, expressed as a percentage) as functions of roundness (on the X-axis) using the samples discussed above. The respective haze ratio values are shown as triangles, while the respective transmission values are shown as squares on the plots of FIGS. 7A-7B. The respective groups of values encircled on the left of FIGS. 7A and 7B represent results without a surfactant, while the respective groups of values encircled on the right of FIGS. 7A and 7B represent results where Pluronics™ P123 (specifically 5%) was employed. The straight line shown in each plot represents the linear percent haze.

FIG. 8 is a histogram of plots showing frequency (on the Y-axis) versus perimeter-Feret (max) Ratio (on the X-axis) for the number of samples that were prepared above. The plot labeled 80 represents sample(s) with no surfactant. The respective plots labeled 81, 82, 83, 84 represent sample(s) where Pluronics™ P123 (specifically 5%) was employed as a surfactant. These graphs show that the addition of the surfactant increases the percent open area in the Titania coating, increases the roundness value of the open spaces (i.e., a circle has a roundness value of 1), and shifts peak maxima and broadens the peak width of the ratio of the open space perimeter to maximum feret length (as indicated by the arrow). These results indicate that the surfactant is acting to roughen the boundary of the open spaces thereby increasing haze values while at least maintaining transmission (if not increasing transmission).

In one or more embodiments, more than one type of binder material 112 may be employed. For example, it has been discovered that application of different binder material layers 112 may lead to desirable transmission ratio, haze ratio, and surface roughness. For example, six (6) diffusing apparatus 100 were produced, each representing a respective sample A-F for evaluation. Each sample was prepared by applying two different binder material layers 112, each layer being spin coated onto the respective glass sheets 102. The two specific binder materials were HardSil™ AM (HAM 100 wt % and HAM 50 wt %, each diluted using isopropanol) and HardSil™ AR (Gelest, PP1-HSAR, HAR 100%, or HAR 50 wt % diluted using IPA). Each binder material was spin coated onto the nanoparticles 110 of the glass sheet 102 using two spin cycles, a slow spin cycle to allow the first (dilute) binder to flow into the nanoparticle structure, and then a faster spin cycle used with the second (concentrated) binder material to form a planarizing layer. Many variations of these cycles are possible to create variations in the light diffusing characteristics of the resultant apparatus.

Sample A was subject to application of the first binder layer (HAR 50%) at a spin cycle speed of 5000 revolutions per minute (RPM), followed by application of the second binder layer (HAR 100%) at a spin cycle speed of 5000 RPM and a cure temperature of 250 degrees C. for one hour. The resulting structure demonstrated a transmission ratio of 85.3%, a haze ratio of 67.4%, and a surface (Zygo) roughness of 0.05 um RMS with a standard deviation of 0.003 um.

Sample B was subject to application of the first binder layer (HAR 50%) at a spin cycle speed of 5000 revolutions per minute (RPM), followed by application of the second binder layer (HAR 100%) at a spin cycle speed of 3000 RPM and a cure temperature of 250 degrees C. for one hour. The resulting structure demonstrated a transmission ratio of 85.1%, a haze ratio of 68.6%, and a surface (Zygo) roughness of 0.064 um RMS with a standard deviation of 0.004 um.

Sample C was subject to application of the first binder layer (HAR 50%) at a spin cycle speed of 5000 revolutions per minute (RPM), followed by application of the second binder layer (HAR 100%) at a spin cycle speed of 1000 RPM and a cure temperature of 250 degrees C. for one hour. The resulting structure demonstrated a transmission ratio of 85.1%, a haze ratio of 66.4%, and a surface (Zygo) roughness of 0.026 um RMS with a standard deviation of 0.003 um.

Sample D was subject to application of the first binder layer (HAM 50%) at a spin cycle speed of 5000 revolutions per minute (RPM), followed by application of the second binder layer (HAM 100%) at a spin cycle speed of 5000 RPM and a cure temperature of 250 degrees C. for one hour. The resulting structure demonstrated a transmission ratio of 85.6%, a haze ratio of 75.1%, and a surface (Zygo) roughness of 0.07 um RMS with a standard deviation of 0.006 um.

Sample E was subject to application of the first binder layer (HAM 50%) at a spin cycle speed of 5000 revolutions per minute (RPM), followed by application of the second binder layer (HAM 100%) at a spin cycle speed of 3000 RPM and a cure temperature of 250 degrees C. for one hour. The resulting structure demonstrated a transmission ratio of 85.4%, a haze ratio of 75.8%, and a surface (Zygo) roughness of 0.07 um RMS with a standard deviation of 0.002 um.

Sample F was subject to application of the first binder layer (HAM 50%) at a spin cycle speed of 5000 revolutions per minute (RPM), followed by application of the second binder layer (HAM 100%) at a spin cycle speed of 1000 RPM and a cure temperature of 250 degrees C. for one hour. The resulting structure demonstrated a transmission ratio of 85.8%, a haze ratio of 71.6%, and a surface (Zygo) roughness of 0.033 um RMS with a standard deviation of 0.002 um.

The light diffusing apparatus 100 discussed above will have some efficiency of scattering light, that propagates through the glass sheet 102 in a waveguide fashion, due to the surface characteristics (or film). The efficiency of scattering as function of film characteristics will change, and in some cases the scattering will be lower than 100%, when the light reaches an opposite side of the glass sheet 102. In this case, one or more embodiments may employ reflectors (not shown) to redirect the light, thereby preventing (or at least reducing) light escaping out the edges of the glass sheet 102, and maintaining as much light propagating within the glass sheet 102 as possible so that such light may be scattered via the light scattering elements 110. Use of reflectors also helps uniformity of the panel lighting, when the scattering elements 110 are substantially uniform over the surface of the glass sheet 102.

Light Diffusing Apparatus and Display System

Figure 9:
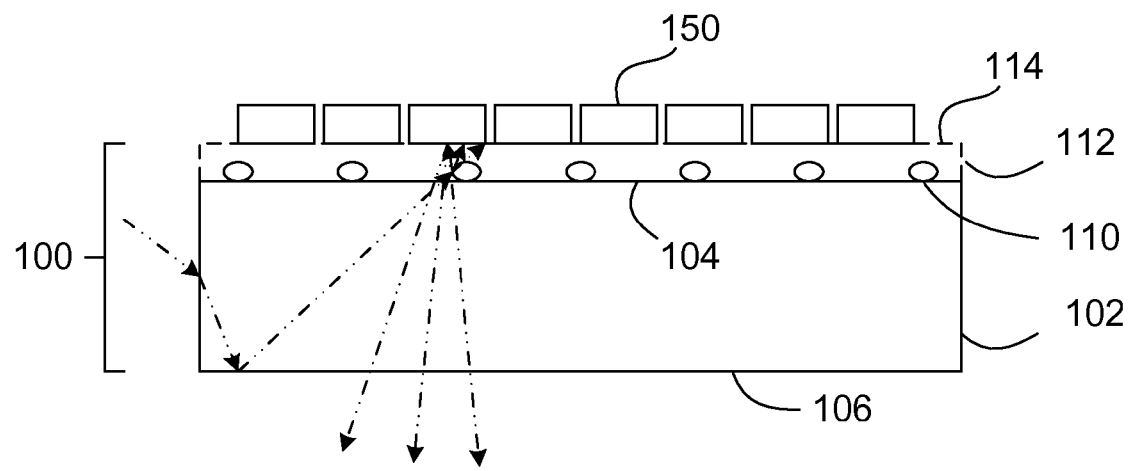
FIG. 9 is a side-sectional view of a display system employing a light diffusing apparatus and a plurality of electronic display elements in accordance with one or more embodiments herein.

Reference is now made to FIG. 9, which is a side-sectional view of a display system 100A employing a light diffusing apparatus 100 and a plurality of electronic display elements in accordance with one or more embodiments herein. The display system 100A may employ any of the aforementioned aspects and/or features of the light diffusing apparatus 100 as a foundation on which a plurality of display components/elements 150 are disposed.

The glass sheet 102 provides a generally planar surface 106 directed towards a viewer of the display system 100A, and the opposing surface 104 on which the plurality of display components 150 are disposed. The collection of individual display components 150 define a large number of pixel sites for manipulating light in accordance with electronic control signaling in order to provide desirable display resolution to the viewer. By way of example, the display components 150 may be individual MEMS components, OLED components, or the like, arranged in an array.

The light diffusing apparatus 100 provides a light diffusing characteristic, such that any light entering the glass sheet 102 from one or more edges, boarders, and/or from the viewing surface 106 is diffused and scattered as it propagates toward the display elements 150. In addition, any light propagating back from the display components 150 will again be diffused as such light passes through the binder layer 112 and elements 110 on its way back to the viewer. Advantageously, such additional diffusion produces better angular emission of the light coming back from the display components 150 to the viewer.

Advantageously, the light diffusing apparatus 100 exhibits a suitably flat planarization surface 114 on which the array of display elements 150 may be disposed using modern and cost-effective manufacturing processes, which include temperatures of about 400 degrees C. or higher. Further, the light diffusing apparatus 100 provides a high haze ratio, a high transmission ratio, and desirable light scattering features (e.g., wide angular scattering) within microns of the surface 104 of the glass sheet 102.

Plastic Substrate Embodiment

It is noted that in various embodiments disclosed herein, the sheet 102 has been discussed as being formed from a glass material. It is noted, however, that in some applications a suitable transparent plastic material may be substituted for the glass sheet 102. Skilled artisans will appreciate which plastic materials will be suitable and which will not when the particular details and exigencies of the application are considered in full and/or some reasonable level of experimentation is performed.

Light Diffusing Apparatus with Light Source

Figure 10:
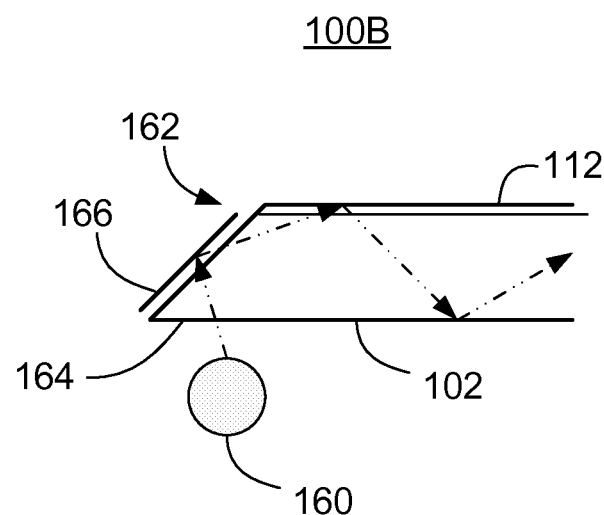
FIG. 10 is a partial schematic diagram of a portion of the light diffusing embodiments disclosed herein including a light source.
Figure 11:
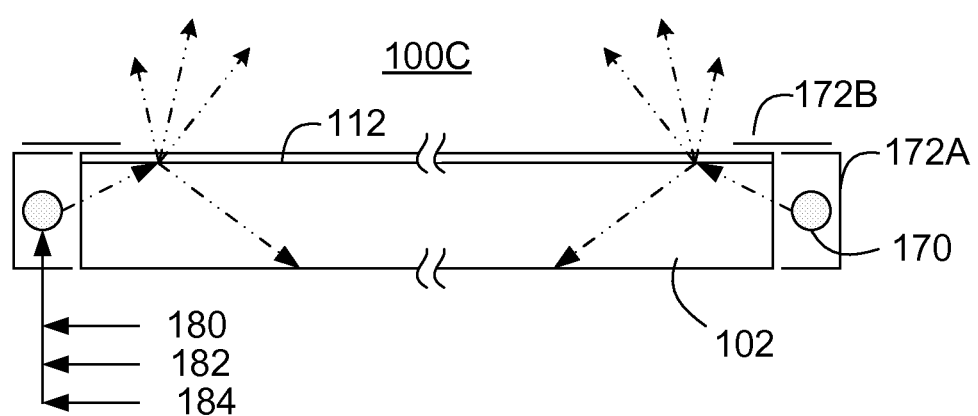
FIG. 11 is a side schematic view of the light diffusing embodiments disclosed herein including a fiber light source.

Reference is now made to FIGS. 10 and 11, which are schematic diagrams of the light diffusing embodiments disclosed herein including at least one light source. In either case, the embodiment may be employed with or without the display components 150 of FIG. 9.

FIG. 10 illustrates a light diffusing apparatus 100B, which includes a light source 160 disposed proximate to the glass (or plastic) sheet 102. The particular location of the light source 160 may be established such that light therefrom is coupled into the glass sheet 102, propagates within the glass sheet 102 in a waveguide mode, and at least a portion of light is diffused and scattered by the scattering layer. For example, the light source 160 may be one or a plurality of LEDs, or other suitable light generating elements, disposed along one or more edges 162 or one or more borders 164 of the glass sheet 102. In one or more embodiments, the one or more edges 162 of the glass sheet 102 may be beveled (and may include a metalized reflective surface 166). The bevel angle is chosen to redirect any light propagating within the glass sheet 102 in one or more directions that reduce the escape of light out of the at least one edge 162.

One or more alternative embodiments may employ one or more light sources and associated structures of the type(s) disclosed in U.S. Patent Application No. 61/407,698, filed Oct. 28, 2010, the entire disclosure of which is incorporated herein in its entirety.

FIG. 11 illustrates a light diffusing apparatus 100C, which includes at least one light diffusing fiber 170 extending along one or more edges of the glass sheet 102, and may optionally include a light redirecting or blocking border 172A, 172B to improve the optical appearance near the edges of the glass sheet 102. The light diffusing fiber 170 may be on the order of about 250-300 microns in diameter.

In a basic embodiment, one or more laser sources may produce white (or semi-white) light to couple into the fiber 170 and thereafter into the glass sheet 102 for diffusing. In one or more alternative embodiments, one or more laser sources, such a red laser source 180 (RED), a green laser source 182 (GREEN) and a blue laser source 184 (BLUE), may couple light energy of differing wavelengths into a single fiber 170, or multiple fibers, in a way that couples such light into the glass sheet 102 and causes diffusion and scattering as discussed previously. Using multiple laser sources permits the production of any number of colors by adjusting the power level of each laser source.

Further details concerning various structures and methodologies associated with modulating the laser sources (e.g., time sequential modulation) to achieve desirable color image functionality and other details concerning the use of the fiber 170 may be found in: U.S. patent application Ser. No. 13/094,221, filed Apr. 26, 2011; U.S. Patent Application No. 61/545,713, filed Oct. 11, 2011; and; U.S. Patent Application No. 61/545,720, filed Oct. 11, 2011, the entire disclosures of which are incorporated herein by reference.

Display System with Transparent Backplane

As mentioned above, there are any number of applications in which the light scattering elements 110 need not be of high refractive index, but rather may be on the order of the same refractive index as the glass (or plastic) sheet 102 and the binder material 112. For example, with reference to FIGS. 12-14 and in accordance with one or more further embodiments herein, methods and apparatus have been developed to provide a backplane for a transparent or semi-transparent display system 200.

Figure 12:
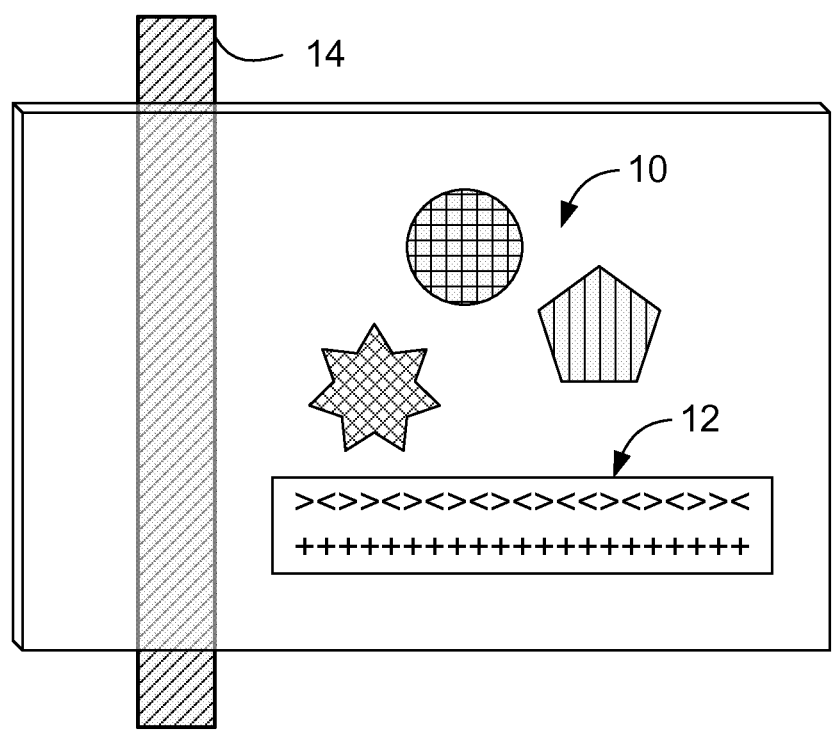
FIG. 12 is a schematic view of a display system employing a light diffusing component in accordance with one or more embodiments herein.

With reference to FIG. 12, the display system 200 operates to produce images 10, text 12, etc. on a display surface, which are viewable to a user. The display system 200 also exhibits transparent or semi-transparent characteristics such that one or more objects 14 behind the system 200 may be seen through the system 200, particularly (or possibly only) when no image is being commanded to exist in front of the object 14. In other words, the display system 200 is at least semi-transparent over one or more portions thereof when the associated display elements (e.g., LCD elements) in such portions are in an off-state. On the other hand, the same portions (or other portions) of the display system 200 may be semi-opaque or totally opaque when the associated display elements in such portions are in an on-state. Thus, one can see through the display system 200 and view the object 14 (such as merchandise, etc.) behind the display, while concurrently receiving visual information (images 10, 12, etc.) on certain portions of the display.

Figure 13:
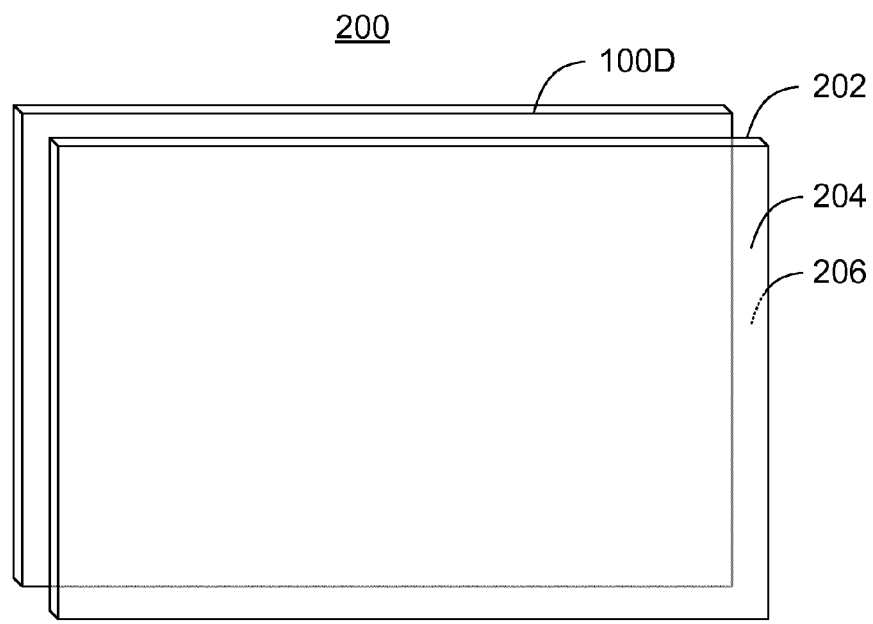
FIG. 13 is a schematic view of further details of the display system of FIG. 12.
Figure 14:
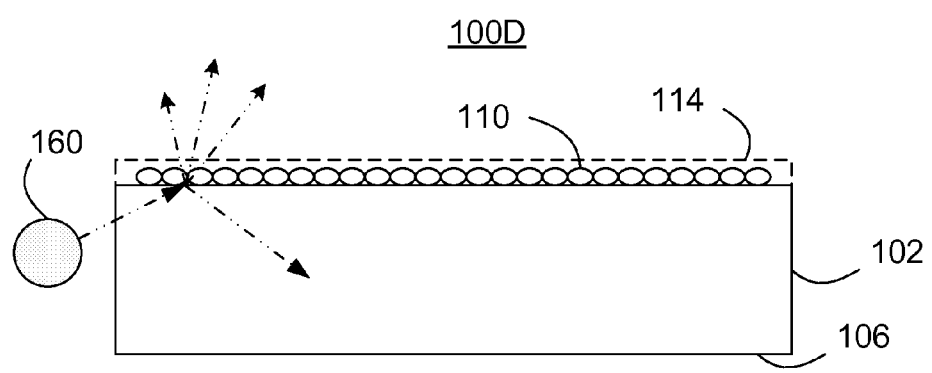
FIG. 14 is a schematic sectional view of a light diffusing component suitable for use in connection with the display system of FIG. 13.

Turning to FIGS. 13-14, the display system 200 includes a display layer 202 having first and second spaced apart major sides 204, 206, and a plurality of display elements (not shown) disposed within (or on) the display layer 202 in an array and operating to produce the images 10, 12, in response to electrical signaling for viewing at (or from) the first major side 204. The display system 200 also includes a light diffusing backplane 100D, having first and second spaced apart major sides 114, 106 and operating to produce diffused light out of the first major side thereof 114. It is noted that the light diffusing backplane 100D may be implemented using any of the light diffusing embodiments expressly or inherently disclosed or suggested herein, particularly those employing one or more light sources 160 or light diffusing fibers 170 to couple light into the diffusing apparatus. The light diffusing backplane 100D is oriented such that the first major side 114 thereof is directed toward the second major side 206 of the display layer 202 such that the diffused light is a source of light for the plurality of display elements.

As noted above, the light scattering elements 110 need not be of high refractive index in this application because of the proximity of the display layer 202 and the light diffusing backplane 100D, and also because the refractive index of air is sufficiently different from the refractive indices of the scattering elements 110 and the binder material 112. Instead, a suitable diffusion, scattering, transmission ratio, haze ratio, etc. may be achieved even though the light scattering elements 110 have a refractive index on the order of the same refractive index as the glass sheet 102 (or plastic sheet) and the binder material 112. One suitable material for the light scattering elements 110 is silica ($SiO_2$).

Although the disclosure herein has been characterized by reference to particular embodiments, it is to be understood that these embodiments are merely illustrative of the principles and applications of such embodiments. It is therefore to be understood that numerous modifications may be made to the illustrative embodiments and that other arrangements may be devised without departing from the spirit and scope of the combinations defined by the appended claims.

The invention claimed is:

1. An apparatus, comprising:
a glass sheet having first and second spaced apart, planar surfaces;
at least one scattering layer having a plurality of sub-micron sized light scattering elements disposed on the first surface of the glass sheet;
a binder disposed on the first surface of the glass sheet and at least partially filling voids between adjacent scattering elements;
a plurality of electronic display elements disposed in an array on or above the binder and operating to produce an image for viewing at the first surface of the glass sheet; and
at least one light source positioned along one or more edges of the glass sheet or borders of the second surface of the glass sheet, wherein light from the at least one light source is diffused and scattered as it propagates toward the display elements.

2. The apparatus of claim 1, wherein:
the light scattering elements are formed from one or more of individual particles, agglomerates, and aggregates of particles; and
an approximate diameter of each scattering element is one of: (i) between about 100 nm to about 500 nm, (ii) between about 200 nm to about 300 nm, and (iii) about 250 nm.

3. The apparatus of claim 1, wherein at least one of:
the light scattering elements have a refractive index substantially higher than a refractive index of the glass sheet; and
the light scattering elements have a refractive index of one of: (i) between about 1.5 and about 4.0, (ii) between about 1.7 and about 2.5, and (iii) at least 2.0.

4. The apparatus of claim 1, wherein the light scattering elements are one or more of: agglomerates of Titania ($TiO_2$), Cerium Oxide ($Ce_2O_3$), Zinc Oxide (ZnO), and Zirconium Dioxide ($ZrO_2$).

5. The apparatus of claim 1, wherein at least one of:
the binder has a refractive index substantially similar to a refractive index of the glass sheet; and
the binder has a refractive index of one of: (i) between about 1.2 and about 1.7, (ii) between about 1.3 and about 1.6, and (iii) about 1.5.

6. The apparatus of claim 1, wherein the binding material is taken from one or more of: polymerized or partially cured poly alkyl siloxane, poly-dimethyl-siloxane, poly-diphenyl-siloxane, polymerized alkyl or aryl silsesquioxane T-resins, poly-methyl-silsesquioxane, poly-methyl-phenyl-silsesquioxane, poly-phenyl-silsequioxane, and uv curable poly siloxanes or silsesquioxanes.

7. The apparatus of claim 1, wherein the binder completely fills the voids and covers the scattering elements to produce a planarization layer.

8. The apparatus of claim 1, wherein the apparatus exhibits at least one of the following optical characteristics: (i) a transmission ratio of between about 70% to about 90%; and (ii) a haze ratio of between about 50% to about 80%.

9. The apparatus of claim 1, wherein at least one of:
the collection of individual display elements define a large number of pixel sites for manipulating light in accordance with electronic control signaling in order to produce the image; and
each display element is an individual MEMS component, or an individual OLED component.

10. The apparatus of claim 1, wherein the at least one light source includes one or more light generating elements disposed along one or more edges or one or more borders of the glass sheet.

11. The apparatus of claim 10, wherein the at least one light source includes at least one light diffusing fiber extending along one or more edges of the glass sheet.

12. The apparatus of claim 1, further comprising one or more reflectors at one or more edges of the glass sheet to redirect any light propagating within the glass sheet in one or more directions that reduce the escape of light out of the at least one edge.

13. A method of producing a light diffusing component, comprising:
provinding a glass sheet having first and second spaced apart, planar surfaces;
applying a slurry comprising at least one surfactant and a plurality of sub-micron sized light scattering elements on the first surface of the glass sheet such that the light scattering elements adsorb to the first surface of the glass sheet;
disposing a viscous binder material onto the first surface of the glass sheet such that the binder material at least partially fills voids between adjacent scattering elements; and
curing the binder material.

14. The method of claim 13, wherein:
the step of applying the slurry includes: (i) employing a dip coating or spin coating process to apply the slurry onto the first surface of the glass sheet, and (ii) heat treating the glass sheet to drive off excess liquids;
the step of disposing the viscous binder material includes employing a dip coating or spin coating process to apply the binder material onto the first surface of the glass sheet.

15. The method of claim 14, wherein a plurality of coats of binder material are applied in order to build up a thickness of the binder layer.

16. The method of claim 15, wherein the number of coats varies in different areas of the glass sheet to produce higher scattering at one or more central areas and lower scattering at one or more peripheral areas of the glass sheet.

17. An apparatus comprising:
a display layer having first and second spaced apart major sides, a plurality of display elements disposed within the display layer in an array and operating to produce an image for viewing at the first major side thereof;
a light diffusing backplane having first and second spaced apart major sides and operating to produce diffused light out of the first major side thereof, wherein:
the light diffusing backplane comprises:
a glass sheet having first and second spaced apart, planar surfaces;
at least one scattering layer having a plurality of sub-micron sized light scattering elements disposed on the first surface of the glass sheet; and
a binder disposed on the first surface of the glass sheet and at least partially filling voids between adjacent scattering elements;
the light diffusing backplane is oriented such that the first major side thereof is directed toward the second major side of the display layer such that the diffused light is a source of light for the plurality of display elements,
the display layer is: (i) at least semi-transparent in one or more portions thereof when the display elements in such portions are in an off-state, and (ii) substantially opaque in such portions when the display elements in such portions are in an on-state, and the light diffusing backplane is substantially transparent such that objects behind the apparatus are visible through both the display layer and the light diffusing backplane.

18. The apparatus of claim 17, wherein the light scattering elements are formed from silica ($SiO_2$).

19. The apparatus of claim 17, wherein the light diffusing backplane further comprises at least one light source disposed proximate to the glass sheet such that light therefrom is coupled into the glass sheet, propagates within the glass sheet in a waveguide mode, and at least a portion of light is diffused and scattered by the scattering layer toward the display layer.

20. The apparatus of claim 19, wherein the light source includes one or more light generating elements disposed along one or more edges or one or more borders of the glass sheet.

21. The apparatus of claim 20, wherein at least one edge of the glass sheet includes a reflective surface, which is beveled at an angle sufficient to redirect any light propagating within the glass sheet in one or more directions that reduce the escape of light out of the at least one edge.

22. The apparatus of claim 21, wherein the reflective surface is metalized.

23. The apparatus of claim 20, wherein the light source includes at least one light diffusing fiber extending along one or more edges of the glass sheet.

* * * * *